(12) United States Patent
Hsu et al.

(10) Patent No.: US 7,850,335 B2
(45) Date of Patent: Dec. 14, 2010

(54) LIGHT SOURCE MODULE

(75) Inventors: Chih-Lu Hsu, Hsinchu (TW); Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 523 days.

(21) Appl. No.: 11/875,244

(22) Filed: Oct. 19, 2007

(65) Prior Publication Data
US 2008/0291672 A1    Nov. 27, 2008

(30) Foreign Application Priority Data
May 25, 2007 (TW) ............... 96118854 A

(51) Int. Cl.
F21V 9/00 (2006.01)
(52) U.S. Cl. ............ 362/231; 362/230; 362/293; 362/612; 362/249.02; 362/249.05
(58) Field of Classification Search ........ 362/230, 362/231, 293, 612, 249.02, 249.05, 800
See application file for complete search history.

(56) References Cited

U.S. PATENT DOCUMENTS

| | | | | |
|---|---|---|---|---|
| 5,851,063 | A * | 12/1998 | Doughty et al. | 362/231 |
| 6,976,779 | B2 * | 12/2005 | Ohtsuki et al. | 362/608 |
| 7,014,336 | B1 | 3/2006 | Ducharme et al. | 362/231 |
| 2002/0163805 | A1 * | 11/2002 | Hubbell et al. | 362/231 |
| 2004/0076921 | A1 | 4/2004 | Gofman et al. | 433/29 |
| 2005/0224821 | A1 * | 10/2005 | Sakano et al. | 257/79 |
| 2006/0002142 | A1 * | 1/2006 | Jeong et al. | 362/612 |
| 2006/0081871 | A1 | 4/2006 | Streubel | |
| 2006/0245203 | A1 * | 11/2006 | Chou et al. | 362/555 |
| 2009/0021178 | A1 * | 1/2009 | Furukawa et al. | 315/250 |

FOREIGN PATENT DOCUMENTS

| | | |
|---|---|---|
| TW | 569475 | 1/2004 |
| TW | I232069 | 5/2005 |
| TW | I244772 | 12/2005 |
| TW | 200735715 | 9/2007 |
| TW | I323141 | 3/2008 |

OTHER PUBLICATIONS

Chinese First Examination Report of China Application No. 200810214686.9, dated Mar. 30, 2010.

* cited by examiner

*Primary Examiner*—Sandra L O Shea
*Assistant Examiner*—Mary Zettl
(74) *Attorney, Agent, or Firm*—J.C. Patents

(57) ABSTRACT

A light source module including a plurality of first point light sources, a plurality of second point light sources, and a plurality of third point light sources is provided. The dominant wavelengths of lights provided by the first point light sources are within a wavelength range of a first color light, and at least two of the first point light sources emit light with different dominant wavelengths. The dominant wavelengths of lights provided by the second point light sources are within a wavelength range of a second color light, and at least two of the second point light sources emit light with different dominant wavelengths. The dominant wavelengths of lights provided by the third point light sources are within a wavelength range of a third color light, and at least two of the third point light sources emit light with different dominant wavelengths.

19 Claims, 11 Drawing Sheets

LIGHT SOURCE MODULE

CROSS-REFERENCE TO RELATED APPLICATION

This application claims the priority benefit of Taiwan application serial no. 96118854, filed on May 25, 2007. All disclosure of the Taiwan application is incorporated herein by reference.

BACKGROUND OF THE INVENTION

1. Field of the Invention

The present invention relates to a light source module, and particularly to a light source module having a better color rendering index (CRI) and a higher color stability.

2. Description of Related Art

FIG. 1 is a schematic view of a conventional light source module. Referring to FIG. 1, a conventional light source module 100 is adapted to be applied in a projection device to provide an illumination beam required for the projection device. The light source module 100 includes a red light emitting diode (red LED) 110r, a green light emitting diode (green LED) 110g, a blue light emitting diode (blue LED) 110b, a reflection mirror 120, two dichroic mirrors 130a and 130b, and a light integration rod 140. Further, the red LED 110r, the green LED 110g and the blue LED 110b provide a red light 112r, a green light 112g and a blue light 112b respectively.

The reflection mirror 120 reflects the red light 112r to the dichroic mirror 130b, and the dichroic mirror 130b is capable of allowing the red light 112r to pass through and reach the light integration rod 140. The dichroic mirror 130a allows the green light 112g to pass through and reach the dichroic mirror 130b, and the dichroic mirror 130a reflects the blue light 112b to the dichroic mirror 130b. The dichroic mirror 130b reflects the green light 112g and the blue light 112b to the light integration rod 140. The light integration rod 140 homogenizes the red light 112r, the green light 112g and the blue light 112b.

FIG. 2 is a normalization spectrum of a red light, a blue light and a green light provided by a conventional light source module. Referring to FIG. 2, it can be observed from FIG. 2 that wavelengths of the red light 112r, the green light 112g and the blue light 112b provided by the conventional light source module 100 are discontinuous within a wavelength range of visual lights. Accordingly, when the red light 112r, the green light 112g and the blue light 112b are mixed into a white light, a color rendering index (CRI) of the white light is low (only within 50-75).

Moreover, since a light-emitting wavelength of a light emitting diode (LED) tends to drift as a temperature of or an electrical current introduced into the LED varies, the color coordinate points of a monochromatic light on a CIE1931 chromaticity diagram are inaccurate, and colors obtained from mixing the red light, the green light and the blue light are unstable. As a result, imaging quality of the projection device is affected.

SUMMARY OF THE INVENTION

One object of the present invention is to provide a light source module which provides an illumination beam with a higher color rendering index and more stable color.

One embodiment of the present invention provides a light source module including a plurality of first point light sources, a plurality of second point light sources and a plurality of third point light sources. The dominant wavelengths of lights provided by the first point light sources are within a wavelength range of a first color light, and at least two of the first point light sources emit lights with different dominant wavelengths. The dominant wavelengths of lights provided by the second point light sources are within a wavelength range of a second color light, and at least two of the second point light sources emit lights with different dominant wavelengths. The dominant wavelengths of lights provided by the third point light sources are within a wavelength range of a third color light, and at least two of the third point light sources emit lights with different dominant wavelengths.

Another embodiment of the present invention provides a light source module including a plurality of first point light sources, a plurality of second point light sources and a plurality of third point light sources. The dominant wavelengths of lights provided by the first point light sources are within a wavelength range of a red light, and at least two of the first point light sources emit lights with different dominant wavelengths. The dominant wavelengths of lights provided by the second point light sources are within a wavelength range of a green light, and at least two of the second point light sources emit lights with different dominant wavelengths. The dominant wavelengths of lights provided by the third point light sources are within a wavelength range of a blue light, and at least two of the third point light sources emit lights with different dominant wavelengths. The dominant wavelengths of lights provided by the two of the first point light sources are $\lambda_{11}$ and $\lambda_{12}$ respectively, $4\text{ nm} \leq |\lambda_{12}-\lambda_{11}| \leq 40\text{ nm}$. The dominant wavelengths of lights provided by the two of the second point light sources are $\lambda_{21}$ and $\lambda_{22}$ respectively, $4\text{ nm} \leq |\lambda_{22}-\lambda_{21}| \leq 20\text{ nm}$. The dominant wavelengths of lights provided by the two of the third point light sources are $\lambda_{31}$ and $\lambda_{32}$ respectively, $4\text{ nm} \leq |\lambda_{32}-\lambda_{31}| \leq 30\text{ nm}$.

Yet another embodiment of the present invention provides a light source module including a first set of a plurality of point light sources. Each of the point light sources in the first set emits ligh with a dominant wavelength within a wavelength range of a first monochromatic light. The wavelengths of lights provided by at least two of the point light sources in the first set are different.

In the light source module of the present invention, the dominant wavelengths of lights provided by the point light sources providing a certain color are different, and therefore a color rendering index (CRI) of the light source module is raised.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

In order to make the aforementioned and other objects, features and advantages of the present invention more comprehensible, preferred embodiments accompanied with figures are described in detail below.

DESCRIPTION OF EMBODIMENTS

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

One embodiment of the present invention provides a light source module including a plurality of first point light sources, a plurality of second point light sources and a plurality of third point light sources. The dominant wavelengths of lights provided by the first point light sources are within a wavelength range of a first color light, and at least two of the first point light sources emit lights with different dominant wavelengths. The dominant wavelengths of lights provided by the second point light sources are within a wavelength range of a second color light, and at least two of the second point light sources emit lights with different dominant wavelengths. The dominant wavelengths of lights provided by the third point light sources are within a wavelength range of a third color light, and at least two of the third point light sources emit lights with different dominant wavelengths.

The light source module of the present invention is, for example, applied to usual lighting or electronic products (a projection device, a liquid crystal display, and so forth) to provide a light source needed by an electronic product. Embodiments of applying the light source module disclosed by the present invention to projection devices and liquid crystal displays (LCDs) are described below, but the embodiments are not intended to limit application of the light source module of the present invention. Furthermore, a first color light, a second color light and a third color light are referred to as a red light, a green light and a blue light respectively in the following description, but such designation is not intended to limit the present invention.

Figure 1:
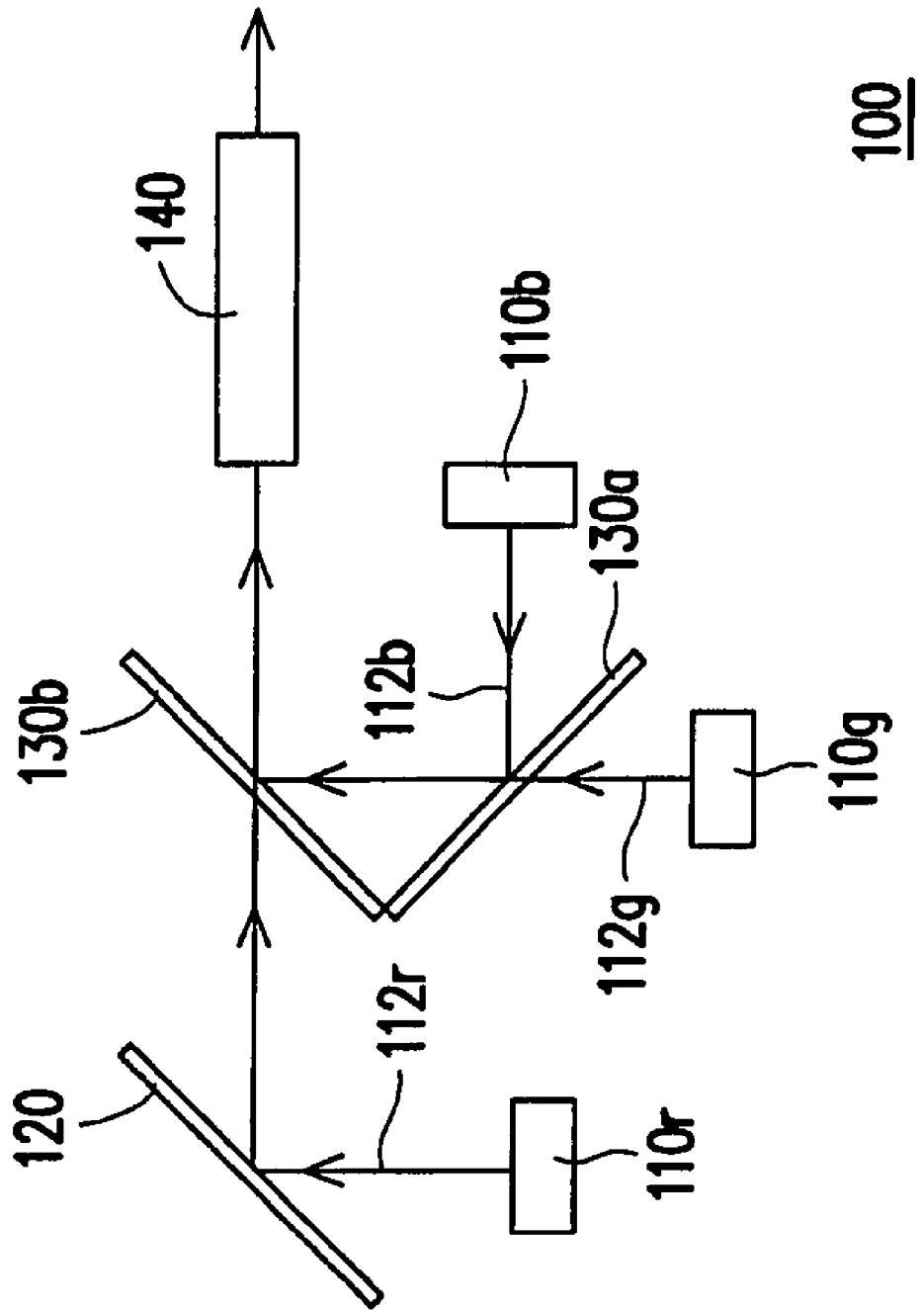
FIG. 1 is a schematic view of a conventional light source module.
Figure 2:
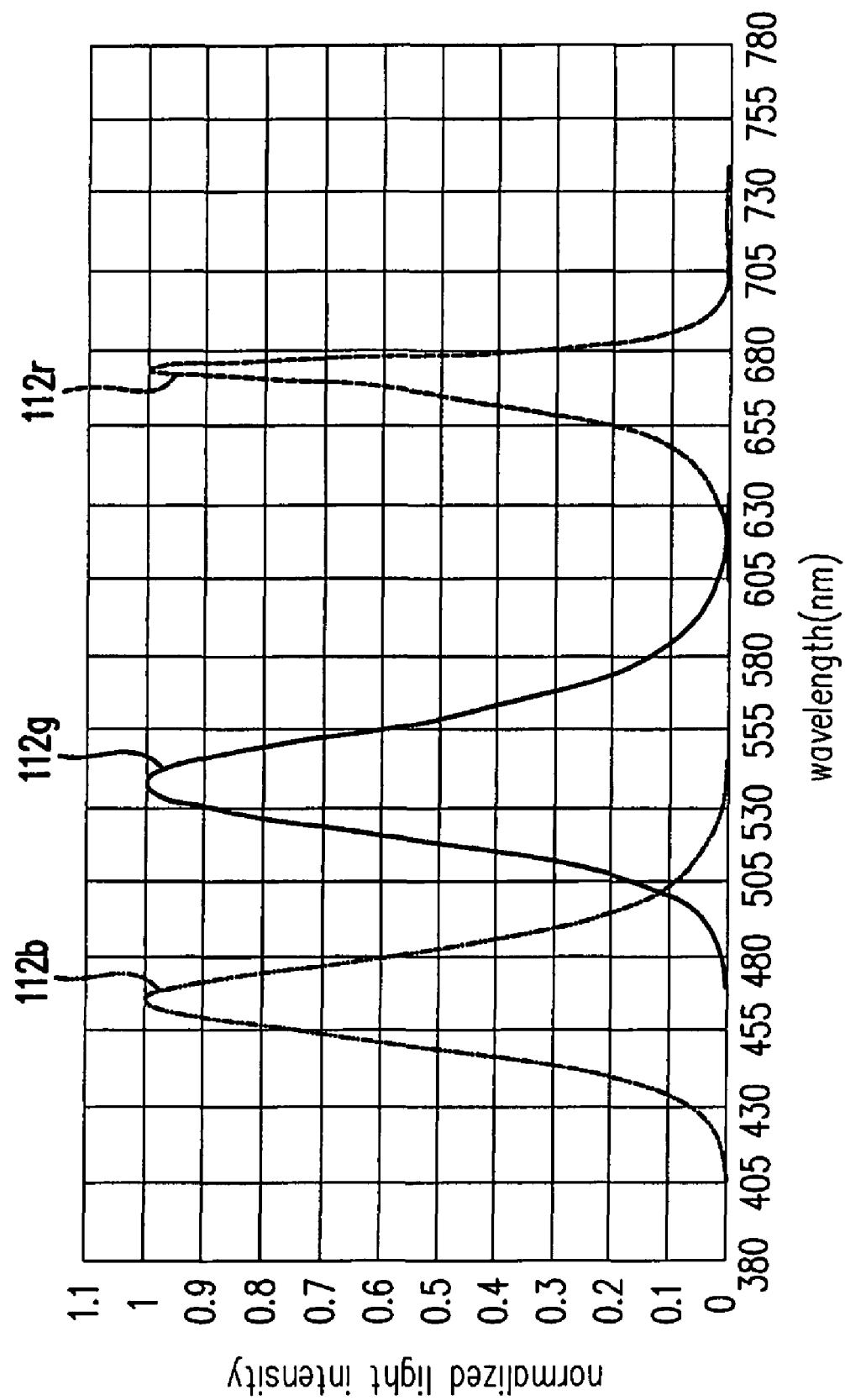
FIG. 2 is a normalization spectrum of a red light, a blue light and a green light provided by a conventional light source module.
Figure 3:
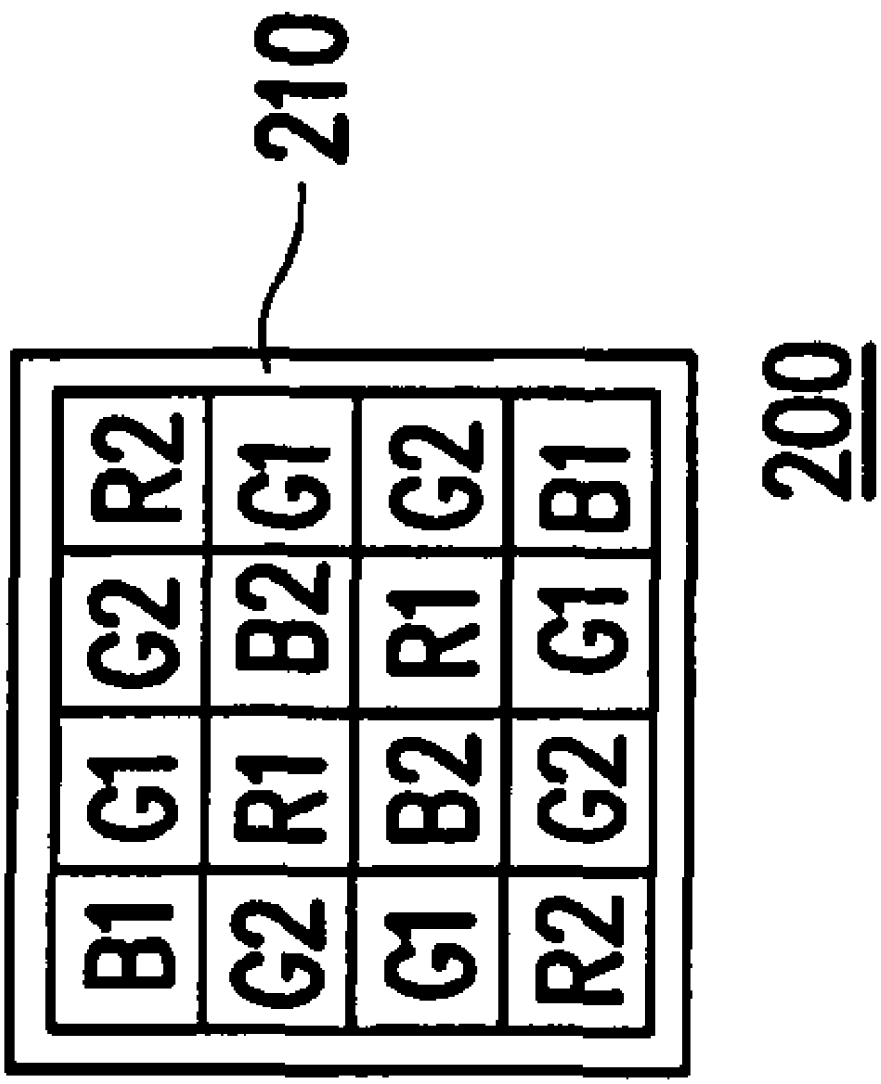
FIG. 3 is a schematic view of a light source module according to one embodiment of the present invention.
Figure 4A:
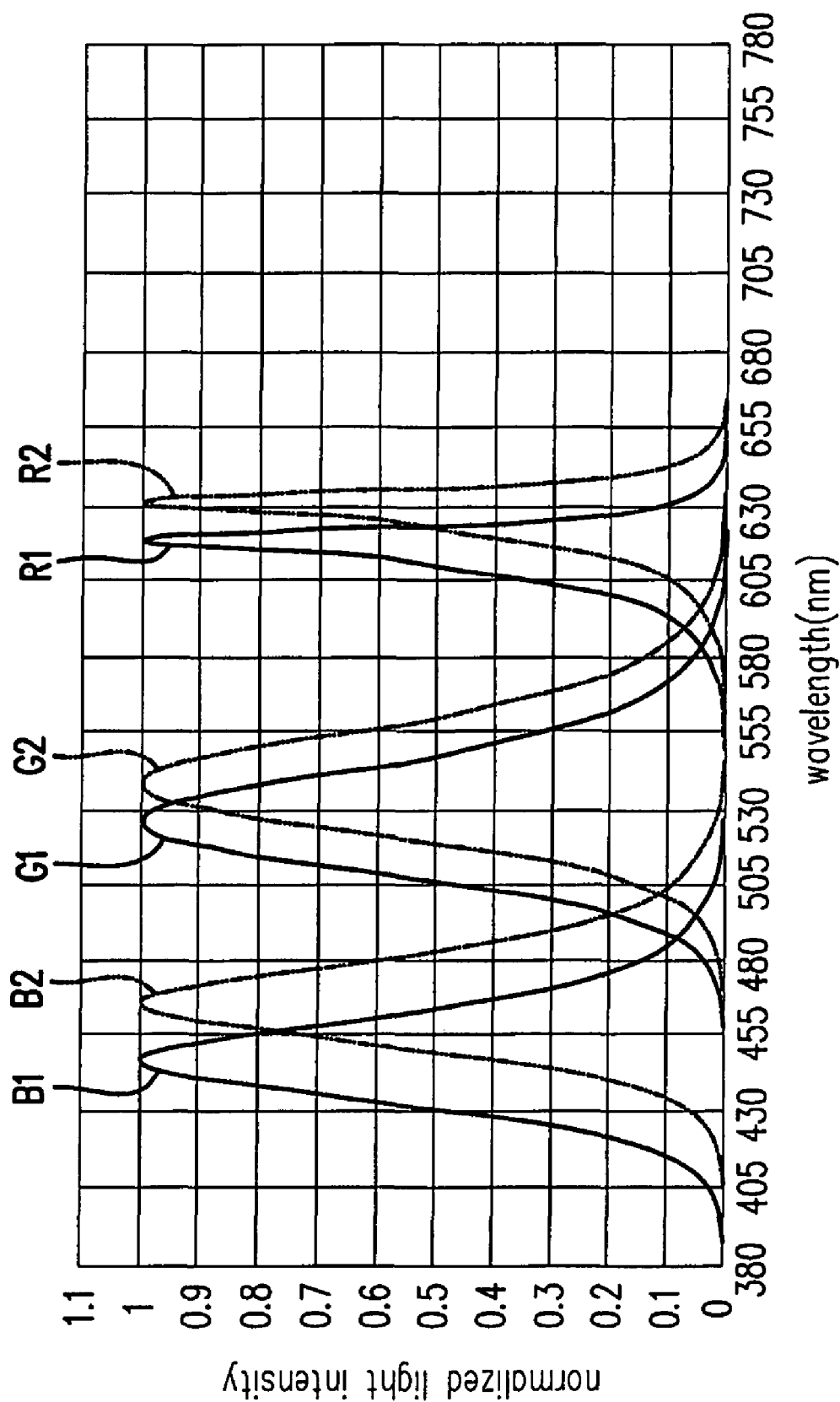
FIG. 4A is a normalization spectrum of each of the point light sources in FIG. 3.
Figure 4B:
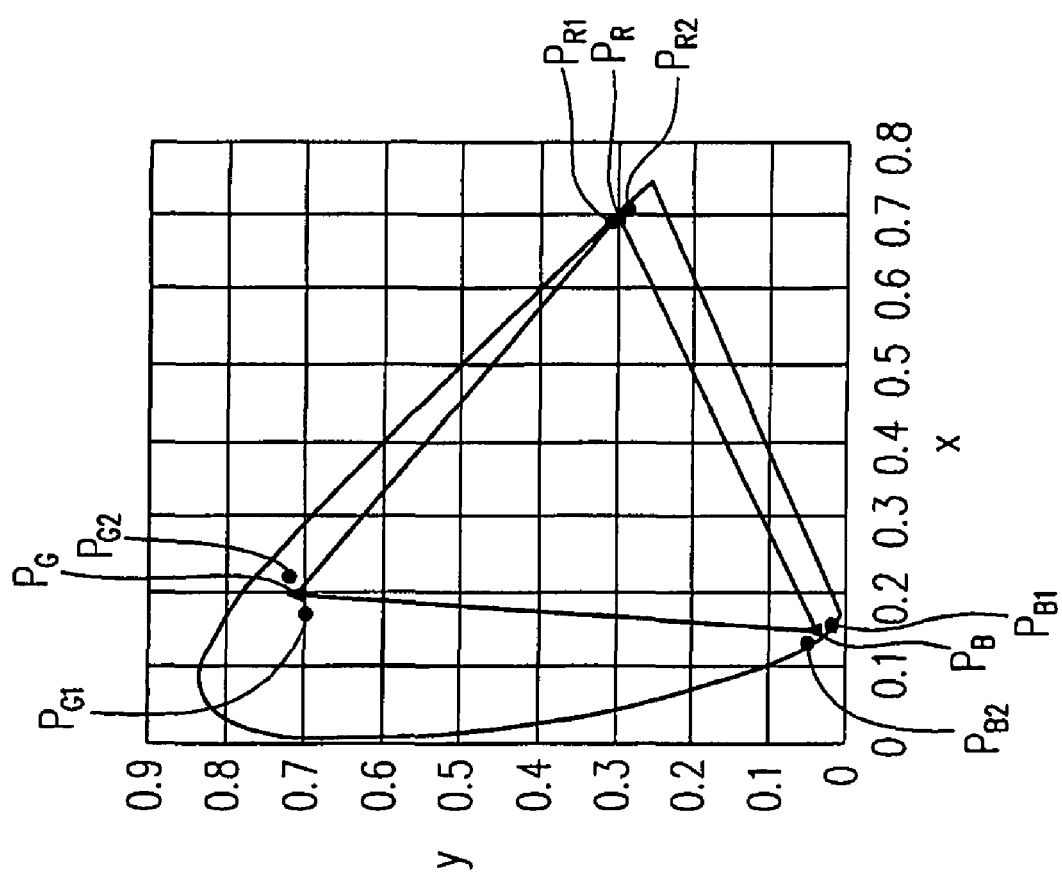
FIG. 4B is a schematic view illustrating color coordinate points corresponding to the lights provided by each of the point light sources of FIG. 3 in a CIE1931 chromaticity diagram.

FIG. 3 is a schematic view of a light source module according to one embodiment of the present invention. FIG. 4A is a normalization spectrum of each of the point light sources in FIG. 3. FIG. 4B is a schematic view illustrating color coordinate points corresponding to lights provided by each of the point light sources of FIG. 3 in a CIE1931 chromaticity diagram. Referring to FIGS. 3 and 4A, a light source module 200 according to the embodiment is adapted to be applied in a projection device to provide an illumination beam required for the projection device. In the light source module 200, first point light sources are divided into two types (i.e., first point light sources R1 and R2). Second point light sources are divided into two types (i.e., second point light sources G1 and G2), and third point light sources are divided into two types (i.e., third point light sources B1 and B2).

The dominant wavelengths of lights provided by the first point light sources R1 and R2 are different, and the dominant wavelengths are within a wavelength range of a red light. The dominant wavelengths of lights provided by the second point light sources G1 and G2 are different, and the dominant wavelengths are within a wavelength range of a green light. The dominant wavelengths of lights provided by the third point light sources B1 and B2 are different, and the dominant wavelengths are within a wavelength range of a blue light. In addition, the first point light sources R1 and R2, the second point light sources G1 and G2, and the third point light sources B1 and B2 are, for example, disposed on a circuit board 210.

The first point light sources R1 and R2, the second point light sources G1 and G2, and the third point light sources B1 and B2 can be light emitting diodes (LEDs) or laser diodes. More specifically, the first point light sources R1 and R2, all the second point light sources G1 and G2 and the third point light sources B1 and B2 are LEDs or laser diodes, or a portion of them are LEDs and the remaining are laser diodes. However, a number of each point light source in the present invention is not limited to two, and the number of each of the point light sources may also be three or more than three. Arrangements of each of the point light sources are not limited to those illustrated in FIG. 3, either.

In one preferred embodiment, the dominant wavelengths of lights provided by the first point light source R1 and the first point light source R2 are $\lambda_{11}$ and $\lambda_{12}$ respectively, 4 nm$\leq$|$\lambda_{12}$-$\lambda_{11}$|$\leq$40 nm. Further, the dominant wavelengths of lights provided by the second point light source G1 and the second point light source G2 are $\lambda_{21}$ and $\lambda_{22}$ respectively, 4 nm$\leq$|$\lambda_{22}$-$\lambda_{21}$|$\leq$20 nm. Moreover, the dominant wavelengths of lights provided by the third point light sources B1 and the third point light source B2 are $\lambda_{31}$ and $\lambda_{32}$ respectively, 4 nm$\leq$|$\lambda_{32}$-$\lambda_{31}$|$\leq$30 nm.

An example designating $\lambda_{11}$, $\lambda_{12}$, $\lambda_{21}$, $\lambda_{22}$, $\lambda_{31}$ and $\lambda_{32}$ as 620 nm, 632 nm, 527 nm, 537 nm, 448 nm and 466 nm is described in the following. Color coordinate points corresponding to lights provided by the first point light sources R1 and R2 in a CIE1931 chromaticity diagram are, for example, $P_{R1}$(0.690, 0.308) and $P_{R2}$(0.712, 0.289). The color coordinate points corresponding to a light mixed from the lights provided by the first point light sources R1 and R2 are $P_R$(0.701, 0.296), and the dominant wavelength of the mixed light is 628 nm. Color coordinate points corresponding to lights provided by the second point light sources G1 and G2 in a CIE1931 chromaticity diagram are, for example, $P_{G1}$(0.180, 0.700) and $P_{G2}$(0.220, 0.720). The color coordinate points corresponding to a light mixed from the lights provided by the second point light sources G1 and G2 are $P_G$(0.199, 0.708), and the dominant wavelength of the mixed light is 531 nm. Color coordinate points corresponding to lights provided by the third point light sources B1 and B2 in a CIE1931 chromaticity diagram are, for example, $P_{B1}$(0.160, 0.020) and $P_{B2}$(0.139, 0.050). The color coordinate points corresponding to a light mixed from the lights provided by the third point light sources B1 and B2 are $P_B$(0.151, 0.033), and the dominant wavelength of the mixed light is 458 nm.

The light source module 200 mixes the lights provided by the first point light sources R1 and R2 to obtain a required red light. The light source module 200 mixes the lights provided by the second point light sources G1 and G2 to obtain a required green light, and mixes the lights provided by the third point light sources B1 and B2 to obtain a required blue light. Hence, the discontinuity problem of the red light, the green light and the blue light within a wavelength range of visual lights in the prior art is mitigated. In this embodiment, a CRI of a white light mixed from the red light, the green light and the blue light is thus raised to 60-85. If the light source module 200 is applied to a projection device, image quality of the projection device is elevated.

As regards the dominant wavelength of a point light source drifts as a temperature thereof or an electrical current introduced thereto varies, in one embodiment of the present invention, unstable quality of a light source provided by the light source module as a result of a drift of the dominant wavelength is mitigated by choosing point light sources with different characteristics.

For example, a material of the first point light source R1 includes InAs/AlGaAs, and the dominant wavelength of the first point light source R1 has a blue shift as the temperature of the first point light source R1 rises. A material of the first point light source R2 includes InGaN/GaN, and the dominant wavelength of the first point light source R2 has a red shift as the temperature of the first point light source R2 rises. Accordingly, when the temperatures of the first point light sources R1 and R2 rise, although the dominant wavelengths thereof have a blue shift and a red shift respectively, a color of a red light mixed from the lights provided by the first point light sources R1 and R2 are less affected.

The dominant wavelength of lights provided by a portion of the first point light sources (such as the first point light source R1) has a blue shift as the temperature of the first point light source rises. The dominant wavelength of lights provided by the remaining first point light source (such as the first point light source R2) has a red shift as the temperature of the first point light source rises. The dominant wavelength of lights provided by a portion of the second point light sources (such as the second point light source G1) has a blue shift as the temperature of the second point light source rises. The dominant wavelength of lights provided by the remaining second point light source (such as the second point light source G2) has a red shift as the temperature of the second point light source rises. Moreover, the dominant wavelength of lights provided by a portion of the third point light sources (such as the third point light source B1) has a blue shift as the temperature of the third point light sources rises. The dominant wavelength of lights provided by the remaining third point light source (such as the third point light source B2) has a red shift as the temperature of the third point light source rises.

Likewise, in another embodiment, the dominant wavelength of lights provided by a portion of the first point light sources (such as the first point light source R1) has a blue shift as the electrical current introduced to the first point light source increases. The dominant wavelength of lights provided by the remaining first point light source (such as the first point light source R2) has a red shift as the electrical current introduced to the first point light source increases. Additionally, the dominant wavelength of lights provided by a portion of the second point light sources (such as the second point light source G1) has a blue shift as the electrical current introduced to the second point light source increases. The dominant wavelength of lights provided by the remaining second point light source (such as the second point light source G2) has a red shift as the electrical current introduced to the second point light source increases. Furthermore, the dominant wavelength of lights provided by a portion of the third point light sources (such as the third point light source B1) has a blue shift as the electrical current introduced to the third point light source increases. The dominant wavelength of lights provided by the remaining third point light source (such as the third point light source B2) has a red shift as the electrical current introduced to the third point light source increases. It should be explained that the dominant wavelength of lights provided by the portion of the first point light source (the second point light source/the third point light source) has a blue shift as the temperature of or the electrical current introduced to the first point light source (the second point light source/the third point light source) increases, "the portion of the first point light sources" indicated here in the present embodiment or expressions of the like refers to a number of one or more than one.

Although the first point light sources, the second point light sources and the third point light sources in the present embodiment are divided into two types, but the first point light sources, the second point light sources and the third point light sources in the present invention can be divided into more than two types. One embodiment in which the first point light sources, the second point light sources and the third point light sources are divided into three types is described in the following.

Figure 5A:
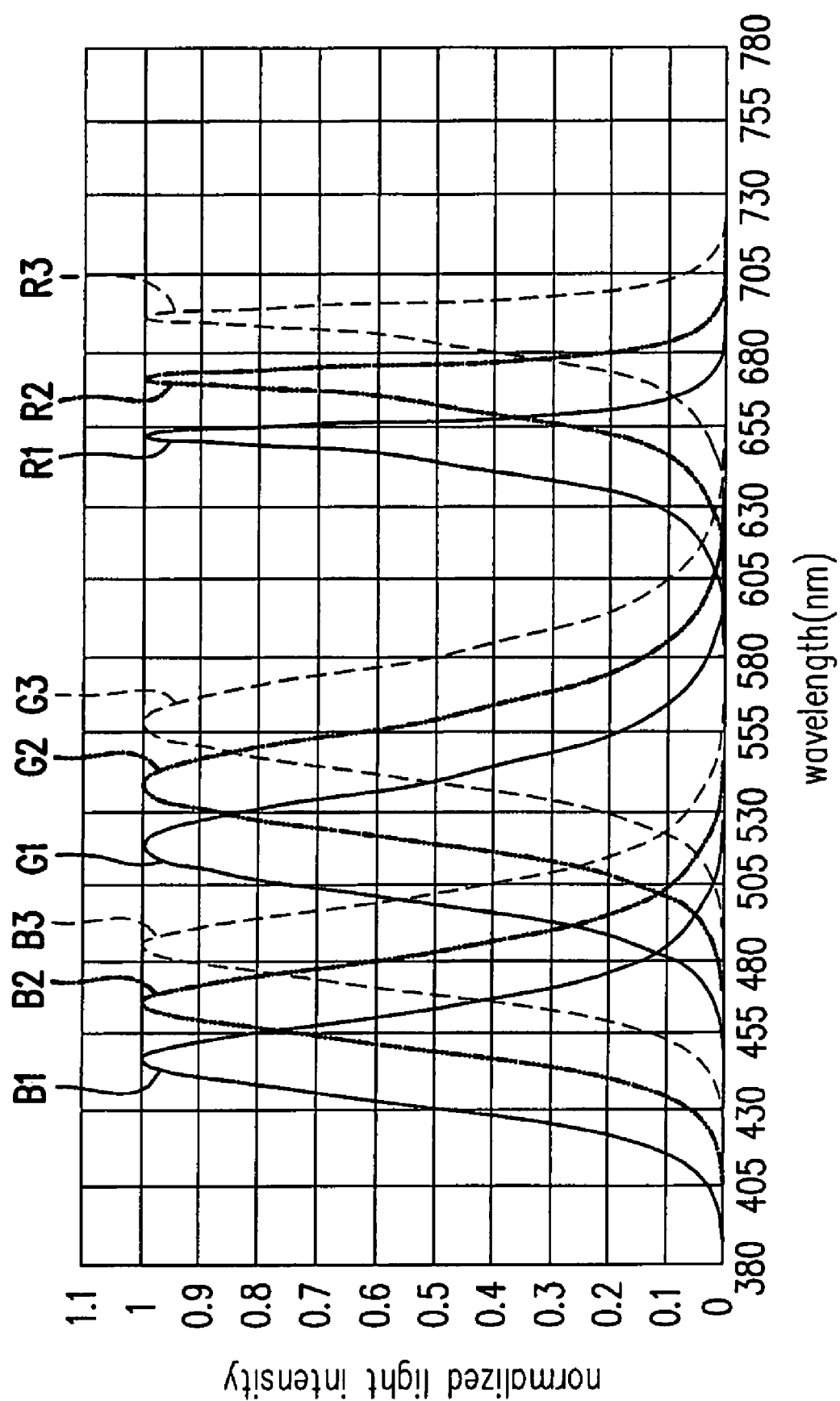
FIGS. 5A and 5B are a normalization spectrum of each point light source and a schematic view of color coordinate points corresponding to lights provided by each of the point light sources in a CIE1931 chromaticity diagram according to another embodiment of the present invention.
Figure 5B:
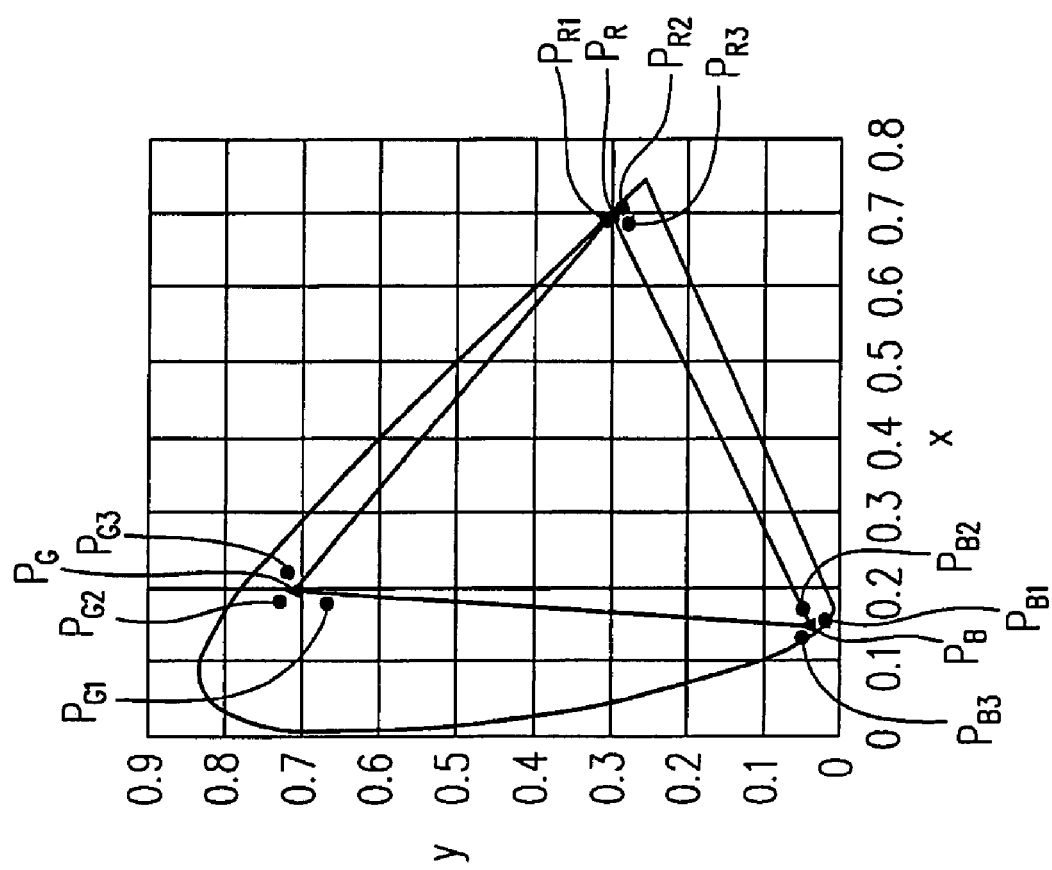

FIGS. 5A and 5B respectively are a normalization spectrum of each of the point light sources and a schematic view of color coordinate points corresponding to lights provided by each of the point light sources in a CIE 1931 chromaticity diagram according to another embodiment of the present invention. Referring to FIGS. 5A and 5B, in the present embodiment, the first point light sources are divided into three types (i.e., the first point light sources R1, R2 and R3), the second point light sources are divided into three types (i.e., the second point light sources G1, G2 and G3), and the third point light sources are divided into three types (i.e., the third point light sources B1, B2 and B3).

The dominant wavelengths of lights provided by the first point light sources R1, R2 and R3 are $\lambda_{11}$, $\lambda_{12}$ and $\lambda_{13}$, 4 nm$\leq$|$\lambda_{12}$-$\lambda_{11}$|$\leq$40 nm and 4 nm$\leq$|$\lambda_{13}$-$\lambda_{12}$|$\leq$40 nm. The dominant wavelengths of lights provided by the second point light sources G1, G2 and G3 are $\lambda_{21}$, $\lambda_{22}$ and $\lambda_{23}$, 4 nm$\leq$|$\lambda_{22}$-$\lambda_{21}$|$\leq$20 nm and 4 nm$\leq$|$\lambda_{23}$-$\lambda_{22}$|$\leq$20 nm. The dominant wavelengths of lights provided by the third point light sources B1, B2 and B3 are $\lambda_{31}$, $\lambda_{32}$ and $\lambda_{33}$, 4 nm$\leq$|$\lambda_{32}$-$\lambda_{31}$|$\leq$30 nm and 4 nm$\leq$|$\lambda_{33}$-$\lambda_{32}$|$\leq$30 nm.

An example respectively designating $\lambda_{11}$, $\lambda_{12}$, $\lambda_{13}$, $\lambda_{21}$, $\lambda_{22}$, $\lambda_{23}$, $\lambda_{31}$, $\lambda_{32}$ and $\lambda_{33}$ as 620 nm, 630 nm, 648 nm, 524 nm, 529 nm, 537 nm, 448 nm, 453 nm and 467 nm is described in the following. The color coordinate points corresponding to lights provided by the first point light sources R1, R2 and R3 in a CIE1931 chromaticity diagram are, for example, $P_{R1}$ (0.691, 0.308), $P_{R2}$(0.708, 0.292) and $P_{R3}$(0.690, 0.280). The color coordinate points corresponding to a light mixed from the lights provided by the first point light sources R1, R2 and R3 are $P_R$(0.701, 0.296), and the dominant wavelength of the mixed light is 628 nm. The color coordinate points corresponding to lights provided by the second point light sources G1, G2 and G3 in a CIE1931 chromaticity diagram are, for example, $P_{G1}$(0.180, 0.670), $P_{G2}$(0.180, 0.730) and $P_{G3}$ (0.220, 0.720). The color coordinate points corresponding to a light mixed from the lights provided by the second point light sources G1, G2 and G3 are $P_G$(0.199, 0.708), and the dominant wavelength of the mixed light is 531 nm. Moreover, the color coordinate points corresponding to lights provided by the third point light sources B1, B2 and B3 in a CIE1931 chromaticity diagram are, for example, $P_{B1}$(0.160, 0.020), $P_{B2}$(0.171, 0.050) and $P_{B3}$(0.133, 0.050). The color coordinate points corresponding to a light mixed from the lights provided by the third point light sources B1, B2 and B3 are $P_B$(0.151, 0.033), and the dominant wavelength of the mixed light is 458 nm.

In this embodiment, the dominant wavelengths of lights provided by the first point light sources, the second point light sources and the third point light sources are divided into three types, and thus the discontinuity problem of the red light, the green light and the blue light within a wavelength range of visual lights in the prior art is mitigated, and a CRI of a white light mixed from the red light, the green light and the blue light is raised to 70-95. In addition, like the previous embodiment, an effect as a result of a drift in the dominant wavelength of the point light source is also mitigated by choosing point light sources with different characteristics.

Figure 6A:
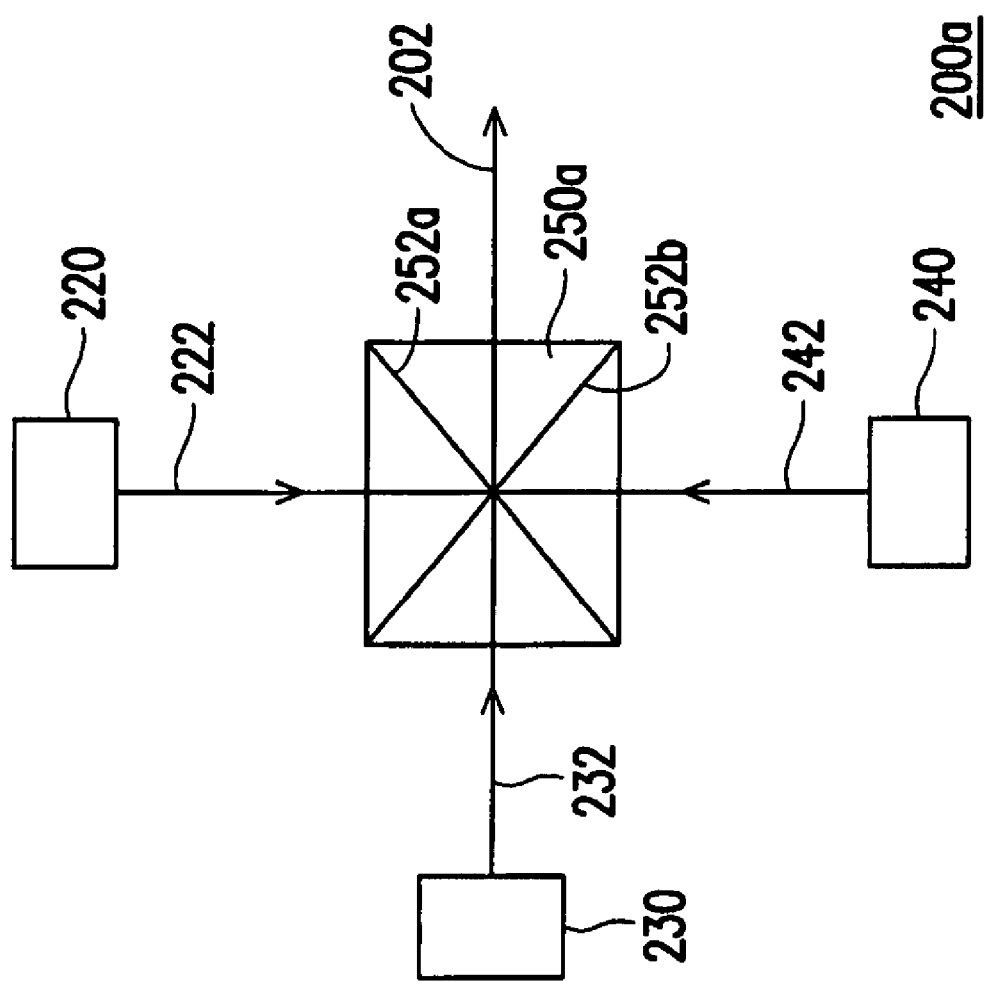
FIGS. 6A and 6B are schematic views of light source modules according to another two embodiments of the present invention.
Figure 6B:
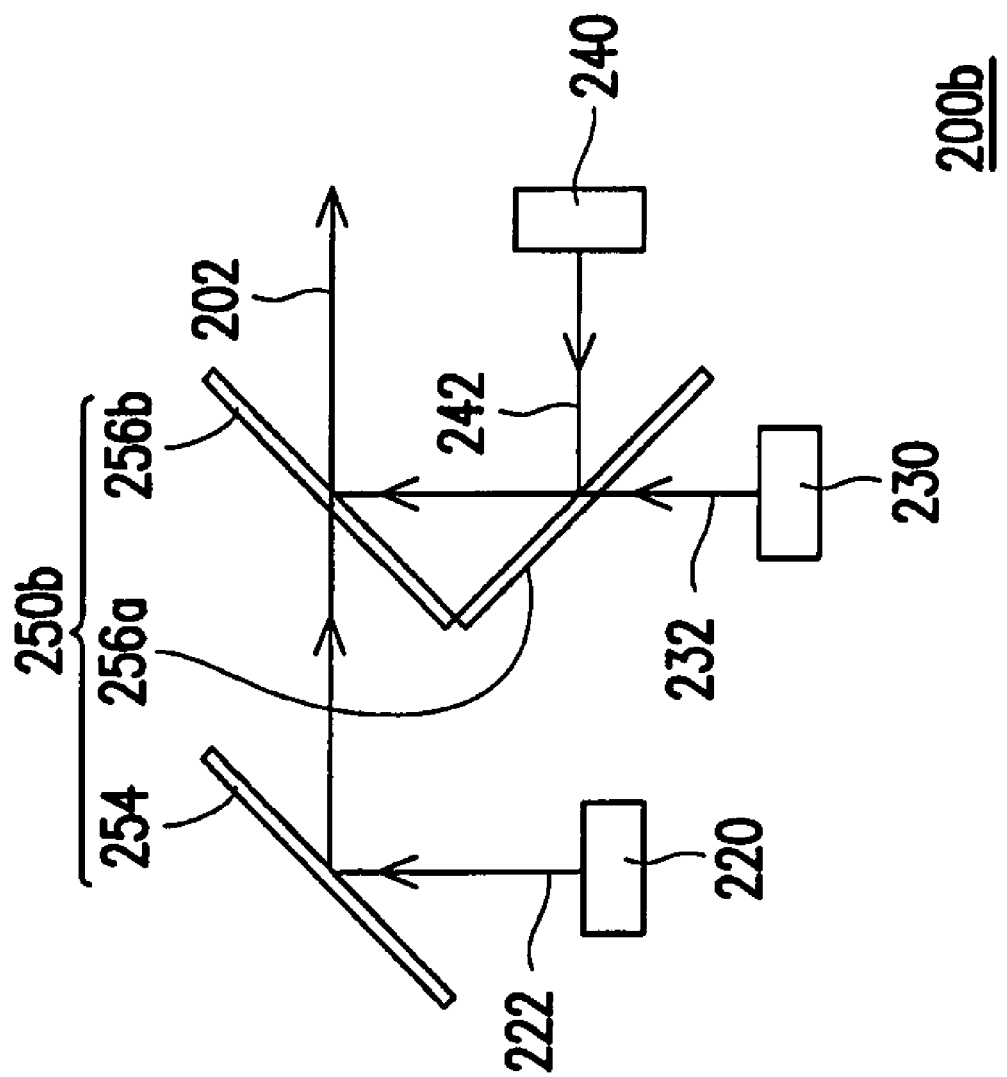

FIGS. 6A and 6B are schematic views of light source modules according to another two embodiments of the present invention. Referring to FIG. 6A, a light source module 200a of the present invention is adapted to be applied in a projection device. The light source module 200a includes a first light source set 220, a second light source set 230, a third light source set 240 and a light-combination unit 250a. The first light source set 220 includes a plurality of first point light sources (not illustrated) of the aforementioned embodiment. The second light source set 230 includes a plurality of second point light sources (not illustrated) of the aforementioned embodiment, and the third light source set 240 includes a plurality of third point light sources (not illustrated) of the aforementioned embodiment. Moreover, like the aforementioned embodiment, the first point light sources, the second point light sources, the third point light sources can be divided into more than two types according to their dominant wavelengths.

The first light source set 220, the second light source set 230 and the third light source set 240 provide a red light 222, a green light 232 and a blue light 242 respectively. The light-combination unit 250a is, for example, an X-prism having two dichroic surfaces 252a and 252b. The dichroic surface 252b allows the green light 232 to pass through and reflects the red light 222. The dichroic surface 252a allows the green light 232 to pass through and reflects the blue light 242 so as to combine the red light 222, the green light 232 and the blue light 242 into an illumination beam 202.

Referring to FIG. 6B, a difference between a light source module 200b of the present embodiment and the light source module 200a in FIG. 6A is a light-combination unit. Specifically, a light-combination unit 250b of the light source module 200b includes a reflection mirror 254 and two dichroic mirrors 256a and 256b. The reflection mirror 254 reflects the red light 222 provided by the first light source set 230 to the dichroic mirror 256b. The dichroic mirror 256a reflects the blue light provided by the third light source set 240 to the dichroic mirror 256b, and allows the green light 232 provided by the second light source set 230 to pass through and reaches the dichroic mirror 256b. The dichroic mirror 256b allows the red light 222 to pass through and reflects the green light 232 and the blue light 242 so as to combine the red light 222, the green light 232 and the blue light 242 into the illumination beam 202.

Figure 7:
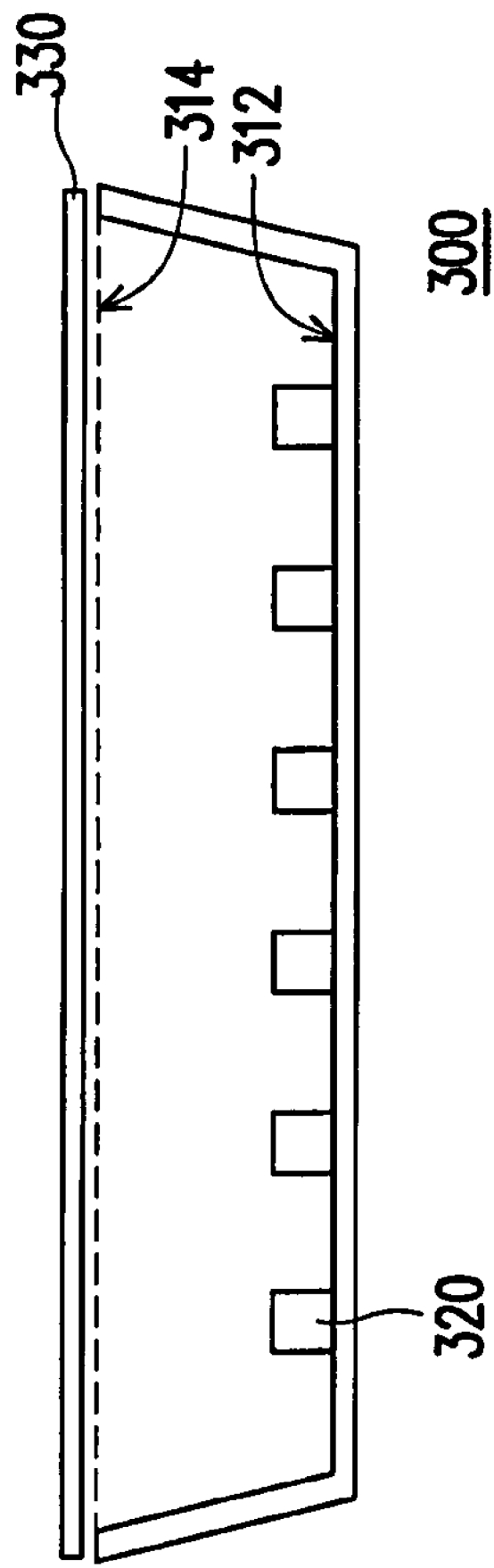
FIG. 7 is a schematic view of a light source module according to yet another embodiment of the present invention.

FIG. 7 is a schematic view of a light source module according to yet another embodiment of the present invention. Referring to FIG. 7, a light source module 300 of the present embodiment is adapted to be applied in an LCD device to provide a display light source required by the LCD device. The light source module 300 includes a light box 310 and a plurality of point light sources 320. The point light sources 320 are disposed on a bottom 312 of the light box 310. The point light sources 320 include a plurality of first point light sources of the aforementioned embodiment, a plurality of second point light sources of the aforementioned embodiment and a plurality of third point light sources of the aforementioned embodiment. Additionally, like the aforementioned embodiment, the first point light sources, the second point light sources and the third point light sources can be divided into more than two types according to their dominant wavelengths. Moreover, a diffusion plate 330 can be disposed at a light-emitting section 314 of the light box 310.

Figure 8:
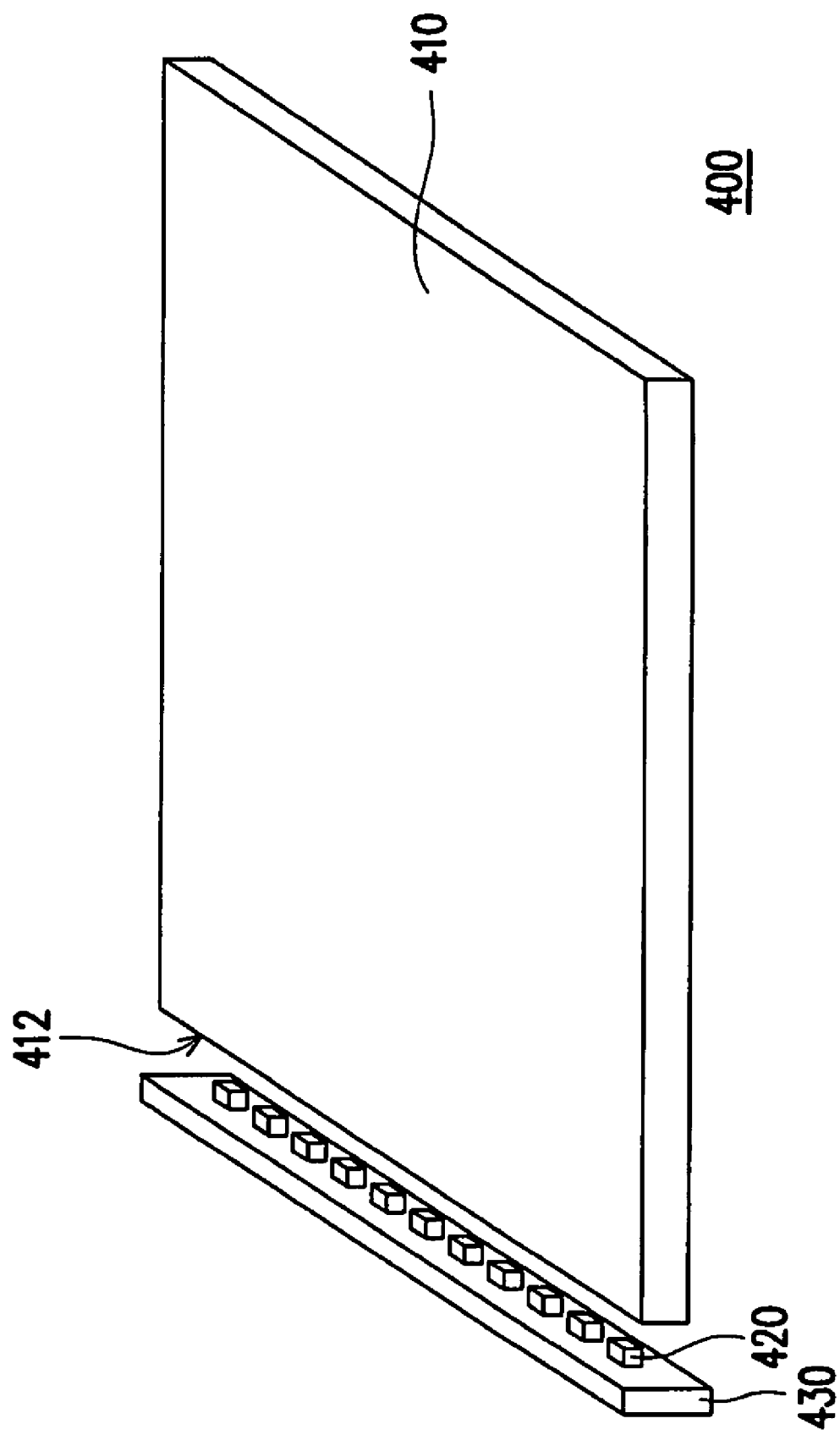
FIG. 8 is a schematic view of a light source module according to still another embodiment of the present invention.

FIG. 8 is a schematic view of a light source module according to still another embodiment of the present invention. Referring to FIG. 8, a light source module 400 of the present embodiment is adapted to be applied in an LCD device to provide a display light source required by the LCD device. The light source module 400 includes a light guide plate 410 and a plurality of point light sources 420. The light guide plate 410 has at least one incident surface 412, and the point light sources 420 are, for example, disposed on a circuit board 430 and adjacent to the incident surface 412 of the light guide plate 410. The point light sources 420 include a plurality of first point light sources of the aforementioned embodiment, a plurality of second point light sources of the aforementioned embodiment and a plurality of third point light sources of the aforementioned embodiment. Moreover, like the aforementioned embodiment, the first point light sources, the second point light sources and the third point light source can be divided into more than two types according to their dominant wavelengths.

Since the first point light sources, the second point light sources and the third point light sources of the light source modules 300 and 400 in FIGS. 7 and 8 are divided into more than two types according to the dominant wavelengths of the lights provided by them, the discontinuity problem of the red light, the green light and the blue light within a wavelength range of visual lights in the prior art is thus mitigated. Hence, a CRI of the white light mixed from the red light, the green light and the blue light is raised so as to improve display quality of the LCD device. Furthermore, like the aforementioned embodiment, in the light source modules 300 and 400, the problem of unstable colors in the light sources provided by the light source modules 300 and 400 as a result of a drift in the dominant wavelengths is mitigated by choosing point light sources with different characteristics.

The light source module of the present invention is not limited to being constituted by three color lights, and it may also be constituted by four or more than four color lights. Moreover, the light source module of the present invention may also be constituted by two color lights, or even by one monochromatic light. For example, in a planting environment of a green house, certain color lights are required to be used (such as a yellow light) for lighting so that pests cannot see the crops. The required light source module is a light source module constituted by a plurality of point light sources. The dominant wavelengths of lights provided by the plurality of point light sources are within a wavelength range of a monochromatic light (such as a yellow light), and at least two of the point light sources emit light with different dominant wavelengths. Additionally, in other applications, such as a certain color light required by a situational lighting, a light source module constituted by a plurality of point light sources is also adopted. The dominant wavelengths of lights provided by the plurality of point light sources are within a wavelength range of a monochromatic light, and at least two of the point light sources emit light with different dominant wavelengths. Thus, a color from the light source provided by the light source module is more stable. Since a spectrum range covered by the light source module is bigger, a CRI of the light source module is raised.

In conclusion, the light source module of the present invention at least as has one or a portion of or all of the following advantages.

In the light source module of the present invention, since the first point light sources, the second point light sources and the third point light sources are divided into more than two types according to their dominant wavelengths of lights provided by them, the CRI of the light source module is raised.

The problem of unstable colors in the light source provided by the light source module as a result of a drift in the dominant wavelengths of the point light sources in the prior art is mitigated by choosing point light sources with different characteristics.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
    a plurality of first point light sources, the dominant wavelengths of lights provided by the first point light sources being within a wavelength range of a first color light, and at least two of the first point light sources emitting lights with different dominant wavelengths;
    a plurality of second point light sources, the dominant wavelengths of lights provided by the second point light sources being within a wavelength range of a second color light, and at least two of the second point light sources emitting lights with different dominant wavelengths; and
    a plurality of third point light sources, the dominant wavelengths of lights provided by the third point light sources being within a wavelength range of a third color light, and at least two of the third point light sources emitting lights with different dominant wavelengths;
    wherein when an electrical current introduced to the first point light sources rises or temperatures of the first point light sources rise, the dominant wavelengths of lights provided by a portion of the first point light sources have a blue shift while the dominant wavelengths of lights provided by the remaining first point light sources have a red shift.

2. The light source module of claim 1, wherein the first color light, the second color light and the third color light are a red light, a green light and a blue light respectively.

3. The light source module of claim 2, wherein the first point light sources are divided into two types, and the dominant wavelengths of lights provided by the first point light sources are $\lambda_{11}$ and $\lambda_{12}$ respectively, $4\,nm \leq |\lambda_{12}-\lambda_{11}| \leq 40\,nm$.

4. The light source module of claim 2, wherein the first point light sources are divided into three types, and the dominant wavelengths of lights provided by the first point light sources are $\lambda_{11}$, $\lambda_{12}$ and $\lambda_{13}$, $4\,nm \leq |\lambda_{12}-\lambda_{11}| \leq 40\,nm$ and $4\,nm \leq |\lambda_{13}-\lambda_{12}| \leq 40\,nm$.

5. The light source module of claim 2, wherein the second point light sources are divided into two types, and the dominant wavelengths of lights provided by the second point light sources are $\lambda_{21}$ and $\lambda_{22}$ respectively, $4\,nm \leq |\lambda_{22}-\lambda_{21}| \leq 20\,nm$.

6. The light source module of claim 2, wherein the second point light sources are divided into three types, and the dominant wavelengths of lights provided by the second point light sources are $\lambda_{21}$, $\lambda_{22}$ and $\lambda_{23}$, $4\,nm \leq |\lambda_{22}-\lambda_{21}| \leq 20\,nm$ and $4\,nm \leq |\lambda_{23}-\lambda_{22}| \leq 20\,nm$.

7. The light source module of claim 2, wherein the third point light sources are divided into two types, and the dominant wavelengths of lights provided by the third point light sources are $\lambda_{31}$ and $\lambda_{32}$ respectively, $4\,nm \leq |\lambda_{32}-\lambda_{31}| \leq 30\,nm$.

8. The light source module of claim 2, wherein the third point light sources are divided into three types, and the dominant wavelengths of lights provided by the third point light sources are $\lambda_{31}$, $\lambda_{32}$ and $\lambda_{33}$, $4\,nm \leq |\lambda_{32}-\lambda_{31}| \leq 30\,nm$ and $4\,nm \leq |\lambda_{33}-\lambda_{32}| \leq 30\,nm$.

9. The light source module of claim 1, wherein when an electrical current introduced to the second point light sources rises or temperatures of the second point light sources rise, the dominant wavelengths of lights provided by a portion of the second point light sources have a blue shift while the dominant wavelengths of lights provided by the remaining second point light sources have a red shift.

10. The light source module of claim 9, wherein when an electrical current introduced to the third point light sources rises or temperatures of the third point light sources rise, the dominant wavelengths of lights provided by a portion of the third point light sources have a blue shift while the dominant wavelengths of lights provided by the remaining third point light sources have a red shift.

11. The light source module of claim 1, further comprising a circuit board, the first point light sources, the second point light sources and the third point light sources being disposed on the circuit board.

12. The light source module of claim 1, further comprising a light-combination unit for combining lights provided by the first point light sources, the second point light sources and the third point light sources into an illumination beam.

13. The light source module of claim 1, further comprising a light box, the first point light sources, the second point light sources and the third point light sources being disposed on a bottom of the light box.

14. The light source module of claim 13, further comprising a diffusion plate disposed at a light-emitting section of the light box.

15. The light source module of claim 1, further comprising a light guide plate having at least one incident surface, the first point light sources, the second point light sources and the third point light sources being disposed adjacent to the incident surface.

16. A light source module, comprising at least a first set of a plurality of point light sources, a dominant wavelength of lights provided by each of the point light sources in the first set being within a wavelength range of a first monochromatic light, at least two of the point light sources in the first set emitting lights with different dominant wavelengths, wherein when an electrical current introduced to the point light sources in the first set rises or temperatures of the point light sources in the first set rise, the dominant wavelengths of lights provided by a portion of the point light sources in the first set have a blue shift while the dominant wavelengths of lights provided by the remaining point light sources in the first set have a red shift.

17. The light source module of claim 16, wherein the monochromatic light is a red light, an orange light, a yellow light, a green light, a blue light, an indigo light or a purple light.

18. The light source module of claim 16, further comprising a second set of a plurality of point light sources, a dominant wavelength of lights provided by each of the point light sources in the second set being within a wavelength range of a second monochromatic light; at least two of the point light sources in the second set emitting lights with different dominant wavelengths, and the first monochromatic light being different from the second monochromatic light.

19. The light source module of claim 18, wherein when an electrical current introduced to the point light sources in the second set rises or temperatures of the point light sources in the second set rise, the dominant wavelengths of lights provided by a portion of the point light sources in the second set have a blue shift while the dominant wavelengths of lights provided by the remaining point light sources in the second set have a red shift.

* * * * *